(12) United States Patent
Kammler

(10) Patent No.: US 6,408,596 B1
(45) Date of Patent: Jun. 25, 2002

(54) DEVICE FOR PACKAGING

(75) Inventor: Roman Kammler, Worms (DE)

(73) Assignee: Rovema Verpackungsmaschinen GmbH, Fernwald (DE)

( * ) Notice: Subject to any disclaimer, the term of this patent is extended or adjusted under 35 U.S.C. 154(b) by 0 days.

(21) Appl. No.: 09/545,256

(22) Filed: Apr. 7, 2000

(30) Foreign Application Priority Data

Apr. 9, 1999 (DE) .......................................... 199 16 003

(51) Int. Cl.[7] .............................................. B65B 51/10
(52) U.S. Cl. .................... 53/373.7; 53/374.6; 53/375.9; 53/376.2
(58) Field of Search ...................... 53/374.6, 374.5, 53/373.7, 375.9, 375.7, 376.2

(56) References Cited

U.S. PATENT DOCUMENTS 5,191,750 A * 3/1993 Kammler
5,653,085 A * 8/1997 Suga
5,881,539 A * 3/1999 Fukuda et al.
6,178,719 B1 * 1/2001 Hansen

FOREIGN PATENT DOCUMENTS

EP 0 469 105 10/1993

* cited by examiner

*Primary Examiner*—Eugene Kim
(74) *Attorney, Agent, or Firm*—Flynn, Thiel, Boutell & Tanis, P.C.

(57) ABSTRACT

In order to reduce the technical input for a device for packaging, for example a horizontal bagging machine, it is suggested to provide two sealing jaws which act against one another and weld a foil web, only one sealing jaw for a rotating operation. The second sealing jaw is co-moved along a path with the first sealing jaw in transport direction of the foil path and is moved back in opposite direction of the foil web. The second sealing jaw is fastened on a carriage which is moved along a horizontal rail, and a carrier connection transfers the component of the rotation motion of the first sealing jaw onto the second sealing jaw, which component extends in the foil transport direction.

13 Claims, 2 Drawing Sheets

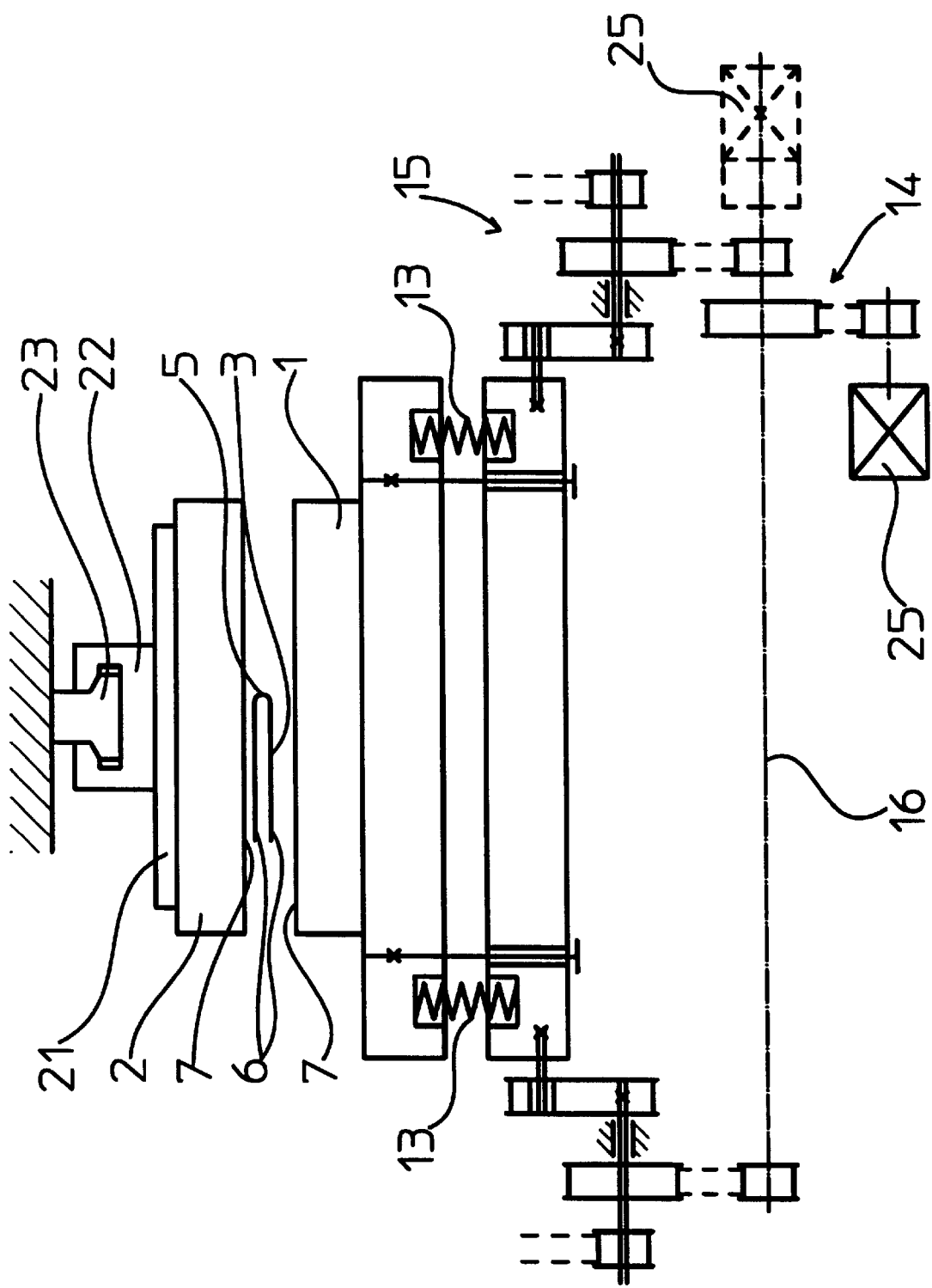

DEVICE FOR PACKAGING

FIELD OF THE INVENTION

The invention relates to a device for packaging comprising a forwardly transported foil web, two sealing jaws for welding of the foil web, whereby the shaped foil web is clamped between the sealing jaws and is welded in this manner, and the first sealing jaw can be moved toward the foil web, with the foil web and away from said foil web, and comprising a cutting device for cutting the welded foil web.

BACKGROUND OF THE INVENTION

It is known in tubular bagging machines that two sealing jaws are moved toward one another in order to weld a tubular or lengthwise folded foil web transversely with respect to its transport direction. Such welded areas of the foil web can be filled and can be welded lengthwise with respect to the transport direction by means of a further welding device, or it is possible to create bag areas open on one side. The areas are cut off from the foil by means of the cutting device so that bags are created. These bags can be filled and welded bags, or empty bags open on one side.

Two sealing jaws of a vertical tubular bagging machine are known from EP 0 469 105, which sealing jaws rotate in opposite direction each about axes, and which each describe a D-shaped path, and which along the straight section of the path in a co-moving manner weld a continuously forwardly moved foil web transversely with respect to its transport direction in order to create in this manner a head seam of a bag and a bottom seam of a following bag in the longitudinally welded foil web. The foil web is cut between these seams.

Furthermore a horizontal tubular bagging machine is known, in which a foil web is folded lengthwise and along its centerline. The foil web is moved forwardly in cycles. Two vertically aligned sealing jaws are moved toward one another during each foil standstill in order to create during one welding operation a side seam of a bag and one side seam of a following bag. The foil web is cut between these side seams in order to separate a created bag from the foil web.

The known devices for packaging have the disadvantage that the mechanics for pressing the sealing jaws against one another is relatively complicated since both sealing jaws are moved away from the foil web and thereafter again toward said foil web. This mechanics is even more complicated when the sealing jaws are over stretches co-moved with the moved foil web in order to weld the foil web during the foil transport.

SUMMARY OF THE INVENTION

The basic purpose of the invention is to reduce in the above-described device the technical requirements for effecting a welding of a moving foil web.

The purpose is attained by supporting the second sealing jaw for a co-movement with the first sealing jaw, the path of co-movement extending coextensively with the foil web, and the second sealing jaw can be moved back against the transport direction of the foil web.

The device of the invention has the advantage that the technical requirement for welding a moving foil web is reduced since merely the first sealing jaw must be moved by means of a jaw drive and by a relatively uncomplicated set of mechanics initially along a sealing stretch with the foil web and must thereafter be removed from the foil web and returned into its initial position. The second sealing jaw is merely co-moved along the sealing stretch on a path synchronously with the first sealing jaw and hereby fulfills its purpose to apply together with the first sealing jaw a sealing pressure onto the foil and to bring heat into two foil areas which lie one on top of the other in order to weld these together. While the first sealing jaw is, at the end of the sealing stretch, removed from the foil web perpendicularly with respect to the transport direction and is thereafter again moved back toward the foil web into its original position in order to act there again against the foil web, the second sealing jaw is moved back by means of a simple set of mechanics against the transport direction of the foil web. Thus, while the first sealing jaw rotates in a plane, the second sealing jaw performs, for example, only a back and forth movement, whereby the latter is moved parallel with respect to the first sealing jaw during the sealing operation.

When the path extends parallel with respect to the transport direction, then the tension in the foil web is constant during the sealing operation. In addition a straight web can be realized in a simple manner. The second sealing jaw can extend on the centerline of the foil web. A welding of the foil takes place only when together with the first sealing jaw a sealing pressure is applied to the foil. However, in order not to influence the foil transport too much during the moving back of the second sealing jaw, a spacing is provided between the sealing surface of the second sealing jaw and the centerline, which spacing is preferably 1 to 4 mm. A good sealing result with a secure foil path is achieved with this spacing. A path can be defined by a rail, along which a carriage is moved, on which the second sealing jaw is fastened. The rail can be straight and can extend parallel to the centerline, however, it could also be curved or circular. In the case of a circular path, the second sealing jaw carries out a circular movement.

The second sealing jaw does not need a separate drive but is co-moved with the movement of the first sealing jaw when a carrier connection is provided between the sealing jaws, which connection takes along the second sealing jaw in correspondence with the movement of the first sealing jaw, which movement occurs in transport direction and opposite thereto. In principle only one carrier would be sufficient. The second sealing jaw could then be moved back into its initial position by means of spring force.

When the transport direction extends horizontally, then it is possible for the foil web to be folded along its centerline and to be sealed in this manner transversely with respect to the transport direction. It is hereby possible to place the second sealing jaw relatively close to the centerline without interfering with the foil pathway.

Relatively high packaging speeds can be achieved when the first sealing jaw rotates about an axis. Whereas if a circular path is not chosen for the first sealing jaw, but a D-shaped one, then a relatively long path with closed sealing jaws is available along the straight D-section in order to carry out a foil welding. A D-shaped circular path is achieved, for example, when the first sealing jaw rotates about two axes of rotation, which are arranged parallel to one another, by means of a four-bar mechanism, whereby the sealing surface is held parallel with respect to the transport direction during the sealing operation by said mechanism. The straight section of the D-shaped circular path is achieved by a cushioning of the first sealing jaw perpendicular with respect to the transport direction.

A relatively high packaging speed is in addition achieved by the first sealing jaw rotating continuously. A servomotor is used for this purpose and also for the purpose that the rotational speed of this sealing jaw must not be constant. The packaging speed is further increased when the first sealing jaw is moved back faster than the sealing jaws are moved during the welding operation.

BRIEF DESCRIPTION OF THE DRAWINGS

The invention will be described in greater detail hereinafter in connection with one exemplary embodiment illustrated in the drawings, in which:

FIG. 2 is a side view of the subject matter of FIG. 1, however, shows in addition a drive and gear means.

DETAILED DESCRIPTION

Figure 1:
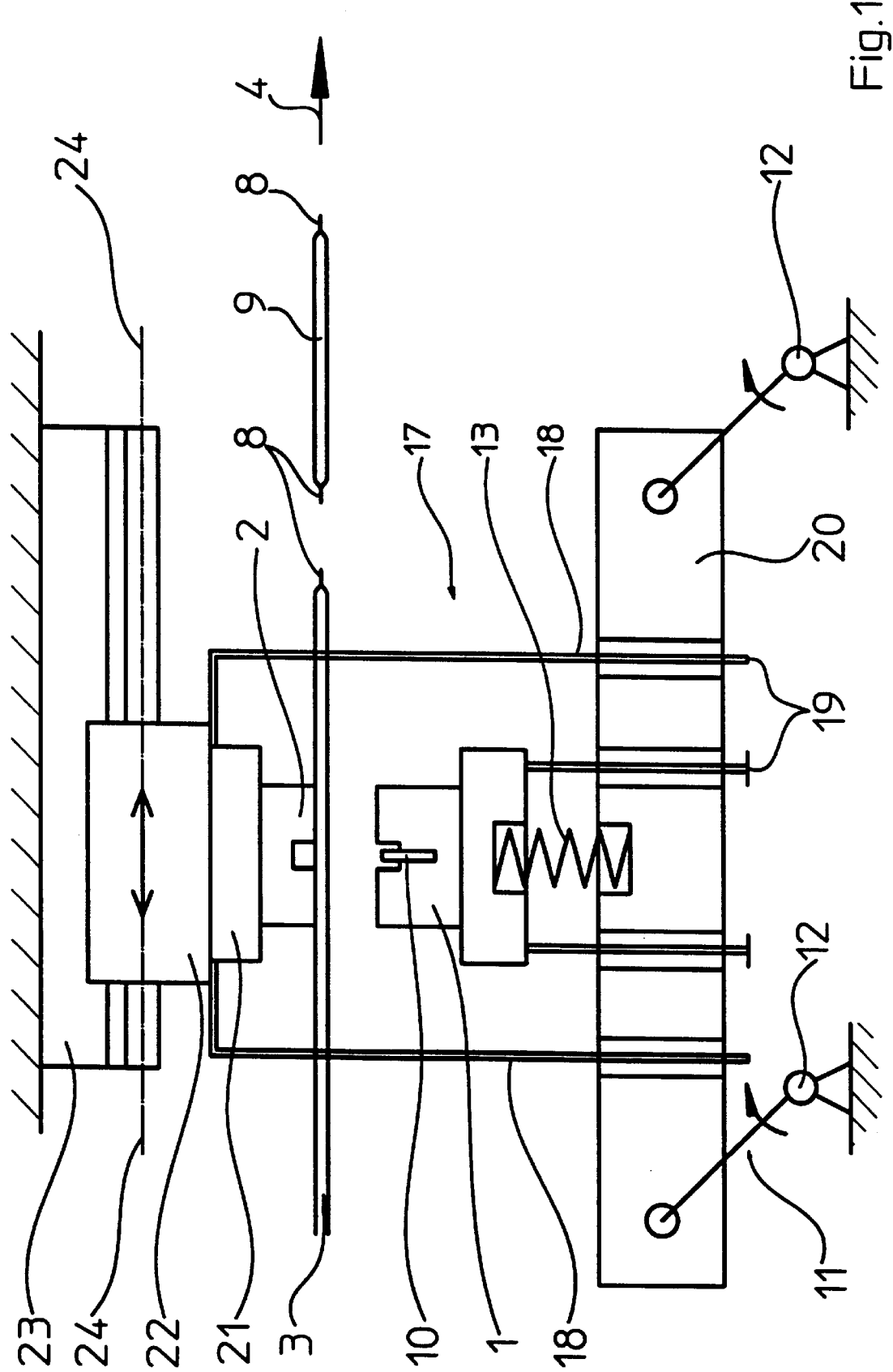
FIG. 1 is a top view of a device for packaging, which is part of a horizontal tubular bagging machine comprising a back and forth moving second sealing jaw, a first sealing jaw rotating by means of a four-bar mechanism, and a foil web bent along its centerline.

A forwardly transported foil web 3 is welded in a device for packaging by means of two sealing jaws 1, 2. The foil web 3 is clamped between the sealing jaws 1, 2 during the welding. The first sealing jaw 1 is in each case moved toward the foil web 3, for a specific distance with the foil web 3, and thereafter, the continued movement describing an arc, away from the foil web 3, and again toward the foil web 3, in opposite direction of the transport direction 4 of the foil web 3. The transport direction extends horizontally. The foil 3 is folded along its centerline 5, whereby the edges 6 of the foil web 3 abut one another. The sealing jaws 1, 2 are aligned vertically, their sealing surfaces 7 create during each sealing operation a side seam 8 of a bag 9 and a side seam 8 of a following bag. The foil web 3 is cut between these sealing seams 8 by means of a cutting device 10 provided in the sealing jaw 1.

The first sealing jaw 1 describes a D-shaped circular path. Same is created by the first sealing jaw 1 rotating by means of a four-bar mechanism 11 about two axes of rotation 12, which are arranged parallel to one another, and by the first sealing jaw 1 being cushioned perpendicularly with respect to the transport direction 4 by means of springs 13. The straight section of the D-shaped circular path is formed due to the cushioning. A servomotor is provided as the drive for the first sealing jaw 1, which servomotor drives the sealing jaw 1 through two toothed-belt drives 14, 15 continuously rotating about an axis 16 of an axle. The servomotor 25, however, could also drive the axle about its axis 16 directly axially (an alternative illustrated in dashed lines).

The second sealing jaw 2 is provided for a co-movement with the first sealing jaw 1. A carrier connection 17 is provided for this purpose between the sealing jaws 1, 2, which connection takes along the second sealing jaw 2 in correspondence with the motion components of the first sealing jaw 1, which motion components extend in transport direction 4 and opposite thereto. The carrier connection 17 has two carriers 18, which are movable in recesses 19 of a support 20 of the first sealing jaw 1. The second sealing jaw 2 is rigidly connected to a carriage 22 through a mounting plate 21, which carriage is fastened movably on a straight rail 23. The rail 23 extends parallel with respect to the transport direction 4. The distance between the sealing surface 7 of the second sealing jaw 2 and the centerline 5 of the foil web 3 is 3 mm so that the foil web 3 when closing the sealing jaws 1, 2 in the welding area is shifted 3 mm away from its centerline 5 toward the second sealing jaw 2.

When the first sealing jaw 1 rotates once, then the second sealing jaw 2 is first moved in transport direction 4 along a path 24, which is parallel to the rail 23 and the foil web 3, and is then moved back on said path 24 in opposite direction of the transport direction 4. With each rotation of the first sealing jaw 1, the second sealing jaw 2 reciprocates once along its path 24. A technically complicated rotation of the second sealing jaw 2 is not necessary.

What is claimed is:

1. A device for packaging comprising first and second spaced apart sealing jaws configured to weld a foil web extending therebetween and moving in a transport direction in a plane of movement, the first sealing jaw being carried by a support that is coupled to a drive mechanism, the drive mechanism being configured to move the first sealing jaw toward the foil web and contacting the foil web at a first position, with the foil web in a first path of movement from the first position to a second position, away from said foil web beginning at the second position, and back to the first position along a second path of movement that is different than the first path of movement, a rail extending along the plane of movement of the foil web and being parallel to the first path of movement of the first sealing jaw, the second sealing jaw being carried by a carriage that is slidably attached to the rail, the carriage being attached to the support by at least one carrier extending through the plane of movement of the foil web, so that movement of the first sealing jaw along the first and second paths of movement will cause the second sealing jaw to reciprocate along the rail in a third path of movement between third and forth positions, wherein the third path of movement is parallel to the first path of movement of the first sealing jaw.

2. The device according to claim 1, wherein the transport direction extends horizontally.

3. The device according to claim 2, wherein the foil web is folded along its centerline, whereby edges of the foil web abut one another, and wherein the sealing jaws are aligned vertically.

4. The device according to claim 1, wherein the first sealing jaw rotates about an axis.

5. The device according to claim 1, wherein the first sealing jaw can be rotated about two axes of rotation which are parallel to one another by means of a four-bar mechanism.

6. The device according to claim 1, wherein the first sealing jaw is cushioned perpendicularly with respect to the transport direction by means of a spring.

7. The device according to claim 1, wherein a distance between a sealing surface of the second sealing jaw and a centerline of the foil web is 1 to 4 mm.

8. The device according to claim 4, including a servomotor that is configured to drive movement of the first sealing jaw.

9. The device according to claim 1, wherein the first sealing jaw rotates continuously.

10. The device according to claim 1, including a cutting device coupled to the first sealing jaw and configured to cut the welded foil web.

11. The device according to claim 1, wherein the rail is a linear rail.

12. The device according to claim 1, wherein the rail is an arcuate rail.

13. A device for packaging comprising first and second spaced apart sealing jaws configured to weld a foil web extending therebetween and moving in a transport direction in a horizontal plane of movement, the foil web being folded along its centerline such that edges of the foil web abut one another, the first and second sealing jaws being aligned vertically, the first sealing jaw being carried by a support that is coupled to a drive mechanism, the drive mechanism being configured to rotate the first sealing jaw about an axis such that the first sealing jaw moves toward the foil web and contacting the foil web at a first position, with the foil web in a first path of movement from the first position to a second position, away from the foil web beginning at the second position, and back to the first position along a second path of movement that is different than the first path of movement, a rail extending along the plane of movement of the foil web and being parallel to the first path of movement of the first sealing jaw, the second sealing jaw being carried by a carriage configured to be moved along the rail, the carriage being coupled to the support by at least one carrier, the at least one carrier extending through the plane of movement of the foil web, so that movement of the first sealing jaw along the first and second paths of movement will cause the second sealing jaw to reciprocate along the rail in a third path of movement between third and fourth positions, wherein the third oath of movement is parallel to the first path of movement of the first sealing jaw.

* * * * *